United States Patent [19]

Zimmerman et al.

[11] Patent Number: 4,800,140
[45] Date of Patent: Jan. 24, 1989

[54] APPARATUS AND METHOD FOR PREVENTING DEGRADATION OF NICKEL HYDROGEN CELLS AND BATTERIES

[75] Inventors: Albert H. Zimmerman; Charles C. Badcock, both of Torrance, Calif.

[73] Assignee: The Aerospace Corporation, El Segundo, Calif.

[21] Appl. No.: 103,856

[22] Filed: Oct. 2, 1987

[51] Int. Cl.$^4$ .............................................. H01M 6/50
[52] U.S. Cl. ...................................... 429/48; 429/101; 429/50
[58] Field of Search ................................... 429/101, 48

[56] References Cited

U.S. PATENT DOCUMENTS

| | | | |
|---|---|---|---|
| 2,862,989 | 12/1958 | Strauss | 429/48 X |
| 3,669,744 | 6/1972 | Tsenter et al. | 429/101 |
| 4,376,811 | 3/1983 | Goebel | 429/101 |
| 4,405,694 | 9/1983 | Goebel et al. | 429/101 |
| 4,619,873 | 10/1986 | Jshikura et al. | 429/48 |
| 4,683,178 | 7/1987 | Stadnick et al. | 429/101 |

*Primary Examiner*—Anthony Skapars
*Attorney, Agent, or Firm*—William J. Burke

[57] ABSTRACT

Disclosed herein is an apparatus and method that maintains a controlled voltage storage mode by applying a controlled voltage to the nickel-hydrogen battery or cells, and which consists of a controlled voltage source connected appropriately to the cells or battery to control their voltage. A resistor is connected between the power source and the nickel-hydrogen cells to limit current in the event of a short circuit or other failure. No diodes or other protection circuitry is needed since the cells contain essentially no stored charge when maintained at approximately 1 volt per cell.

1 Claim, 1 Drawing Sheet

APPARATUS AND METHOD FOR PREVENTING DEGRADATION OF NICKEL HYDROGEN CELLS AND BATTERIES

STATEMENT OF GOVERNMENT INTEREST

The invention described herein may be manufactured and used by or for the Government of the United States for governmental purposes without the payment of royalty therefor.

BACKGROUND OF THE INVENTION

1. Field of the Invention

The present invention relates to nickel-hydrogen batteries and cells and more particularly to a method and apparatus for storing such batteries and cells in a way that will minimize internal battery cell degradation.

The method applies equally to both cells with hydrogen stored in pressure vessels and those using metal hydride storage or electrodes.

2. Description of the Prior Art

Experience with nickel-hydrogen batteries and battery cells has indicated that under some conditions of storage, the capacity of the cells can degrade as a result of undesirable chemical reactions. Investigation has revealed that storage at high voltages is also a concern because oxidation of active material oxides and the generation of oxygen causes the nickel-hydrogen batteries or cells to degrade.

However, the condition of primary concern is storage at low voltage. If excess hydrogen is present in the cell it can result in chemical reduction of the active material oxides in the nickel electrode.

To alleviate this condition, one alternative approach provides for storage at low voltages with excess nickel electrode capacity. This approach has several disadvantages. It reduces the cell energy density and allows oxidation of the negative electrode catalysts during storage if the negative electrode potential rises to that of the nickel electrode.

Conventional methods for storing nickel-hydrogen batteries or cells have been drawn directly from experience with nickel-cadmium batteries. These storage methods are either open circuited and discharged or short circuited and discharged. In the open circuited case, the cell will gradually drop to low voltages as a result of catalytic self-discharge processes at the nickel electrode. In the short circuited case, the cell will drop to a low voltage because of the short circuit connection between the cell terminals. In contrast to nickel-cadmium cells, the negative mass in a nickel-hydrogen cell (hydrogen) is in direct contact with the positive mass and slowly reacts to effect complete discharge similar to an external short circuit.

It is therefore an object of this invention to provide a method for storing nickel-hydrogen batteries and cells that precludes all of the degradation modes outlined above, as well as all other degradation modes known to result from storage.

It is also an object of this invention to provide an apparatus for applying this storage method to both nickel-hydrogen batteries and battery cells.

SUMMARY OF THE INVENTION

An apparatus and method for maintaining nickel-hydrogen cells or batteries without degradation over extended periods of time. A controlled voltage is applied to the nickel-hydrogen cell continuously for the duration of the storage period. A power source means and a current limiting means are used to apply a controlled voltage across each cell or battery.

DETAILED DESCRIPTION OF THE PREFERRED EMBODIMENT

The inventors have discovered that storing nickel-hydrogen batteries or cells at a controlled voltage high enough to avoid the reduction of active materials by hydrogen in the nickel electrode, and at a controlled voltage low enough to avoid the generation of oxygen and to preclude other deleterious chemical reactions significantly, retards the degradation of nickel-hydrogen cells and batteries.

This voltage should be in the range of 0.5 to 1.1 volts per cell and the potential from the positive, nickel electrode to the negative, hydrogen electrode should have a positive sign [+ to −]. Below 0.5 volts, the reduction of nickel electrode active material oxides begins to become a concern, while above 1.1 volts, oxidation of these oxides and the generation of oxygen becomes a concern. A voltage of about 1.0 volts appears to be near optimum, since no faradaic electrochemical processes are known to occur in the nickel-hydrogen cell in this voltage region. At 1 volt per cell, chemical or electrochemical reduction of nickel electrode oxides cannot occur, and electrochemical oxidation of platinum will not take place, independent of whether the cells are constructed with excess positive or negative electrode capacity.

The storage method disclosed herein does not require low storage temperatures to be effective. However, a storage temperature of 32–40 degrees F. is regarded as a good compromise between material compatibility problems at very low temperatures and possible material instability problems at very high temperatures.

Figure 1:
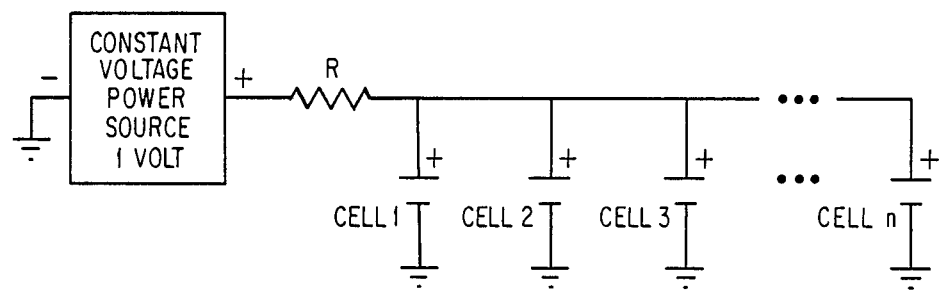
FIG. 1 illustrates a preferred embodiment of the present invention as applied to individual nickel-hydrogen cells.
Figure 2:
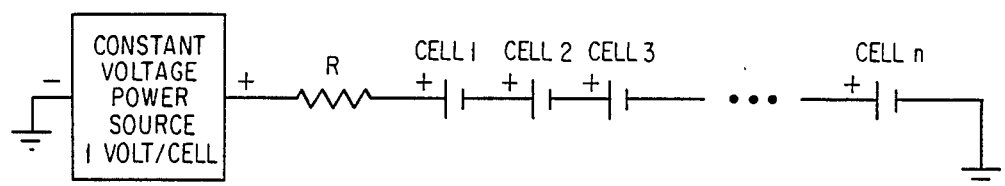
FIG. 2 illustrates a preferred embodiment of the present invention as applied to a battery consisting of nickel-hydrogen cells which are connected in series.

Schematic diagrams for a preferred embodiment of the present invention are shown at in FIG. 1 and FIG. 2. FIG. 1 indicates a Parallel cell connection appropriate for storing a number of individual cells at a controlled voltage, nominally 1 volt. FIG. 2 indicates a device appropriate to maintaining a battery, or series connected string of cells, at a controlled voltage (nominally 1 volt per cell). A resistor is connected between the power source and the cells to limit current in the event of a short circuit or other failure. The circuit of FIG. 1 requires somewhat higher current, however, and operates at about 1 volt. The circuit of FIG. 2 operates at a higher voltage, which is determined by the number of cells in the battery, but has a very low current drain.

The devices of FIGS. 1 and 2 have been evaluated in test cells and have been found to maintain the cells with no detectable side reactions for periods up to 3 months, which was the duration of the test. Cells stored near zero volts for the same 3-month period exhibited significant levels of nickel electrode active material reduction, a process known to degrade nickel hydrogen cell performance characteristics. The existing knowledge of the reactions that occur in the nickel-hydrogen cell suggests that under the controlled voltage conditions outlined in this disclosure, cell storage up to 10 years with little degradation from the known parasitic reactions may be feasible.

We claim:

1. A method for preventing degradation of one or more nickel hydrogen cells, which comprises the steps of:
   (a) continuously applying a controlled voltage of between 0.5 to 1.1 volts to a circuit from a controlled voltage means; and
   (b) limiting a flow of current from the controlled voltage means to the nickel hydrogen cells.

* * * * *